(12) United States Patent
Song et al.

(10) Patent No.: US 7,266,516 B2
(45) Date of Patent: Sep. 4, 2007

(54) SYSTEM AND METHOD FOR CREATING A CUSTOMIZED ELECTRONIC CATALOG

(75) Inventors: Jinshan Song, Park City, IL (US); Geoffry Arthur Westphal, Park Ridge, IL (US)

(73) Assignee: W. W. Grainger Inc., Lake Forest, IL (US)

( * ) Notice: Subject to any disclaimer, the term of this patent is extended or adjusted under 35 U.S.C. 154(b) by 403 days.

(21) Appl. No.: 09/877,612

(22) Filed: Jun. 9, 2001

(65) Prior Publication Data

US 2003/0083959 A1 May 1, 2003

Related U.S. Application Data

(63) Continuation of application No. 09/877,604, filed on Jun. 8, 2001, now abandoned.

(51) Int. Cl.
*G06F 17/30* (2006.01)
(52) U.S. Cl. .......................................... 705/27; 705/26
(58) Field of Classification Search ................ 705/26, 705/27; 707/5; 345/426
See application file for complete search history.

(56) References Cited

U.S. PATENT DOCUMENTS

| | | | | |
|---|---|---|---|---|
| 5,319,542 A | * | 6/1994 | King et al. ................. 705/27 |
| 5,664,110 A | * | 9/1997 | Green et al. ................. 705/1 |
| 5,727,196 A | | 3/1998 | Strauss, Jr. et al. |
| 5,761,649 A | * | 6/1998 | Hill .............................. 705/26 |
| 5,870,717 A | * | 2/1999 | Wiecha ........................ 235/385 |
| 5,884,281 A | * | 3/1999 | Smith et al. ................. 705/26 |
| 5,940,821 A | | 8/1999 | Wical |
| 5,956,709 A | * | 9/1999 | Xue .............................. 705/26 |
| 5,959,945 A | * | 9/1999 | Kleiman ..................... 340/5.74 |
| 6,005,571 A | * | 12/1999 | Pachauri ..................... 345/671 |
| 6,023,683 A | * | 2/2000 | Johnson et al. ................. 705/1 |
| 6,029,163 A | | 2/2000 | Ziauddin |
| 6,032,145 A | * | 2/2000 | Beall et al. .................... 705/26 |

(Continued)

FOREIGN PATENT DOCUMENTS

EP   WO 2004/034285 A1   *   4/2004
WO   WO 01/01291 A1       1/2001

OTHER PUBLICATIONS

"Valin Corporation Unveils ValinOnline.com—A New Online Business-to-Business E-Catalog" Business Wire (Mar. 23, 2000).*

(Continued)

*Primary Examiner*—Mark Fadok
(74) *Attorney, Agent, or Firm*—Gary R. Jarosik

(57) ABSTRACT

A system and method for creating a customized product catalog. The customized catalog is created in response to a request to search an electronic catalog that has data representative of a plurality of products each having one or more attributes. The search request includes at least one user-specified attribute of interest. Products in the electronic catalog are identified that have an attribute corresponding to the user specified attribute of interest. The identified products are aggregated into a sub-catalog that includes data representative of the identified products which data is formatted using a user-specified electronic format. In this manner, a customized catalog can be created for used in a user-specific electronic commerce system.

12 Claims, 18 Drawing Sheets

U.S. PATENT DOCUMENTS

| | | | |
|---|---|---|---|
| 6,038,560 | A | 3/2000 | Wical |
| 6,038,603 | A | 3/2000 | Joseph |
| 6,052,531 | A * | 4/2000 | Waldin et al. ............... 707/10 |
| 6,072,481 | A * | 6/2000 | Matsushita et al. ......... 345/700 |
| 6,078,923 | A | 6/2000 | Burrows |
| 6,094,649 | A | 7/2000 | Bowen et al. |
| 6,094,652 | A | 7/2000 | Faisal |
| 6,101,515 | A | 8/2000 | Wical et al. |
| 6,169,986 | B1 * | 1/2001 | Bowman et al. ............. 707/10 |
| 6,192,436 | B1 * | 2/2001 | Jacobson et al. ........... 710/104 |
| 6,223,171 | B1 | 4/2001 | Chaudhuri et al. |
| 6,249,773 | B1 * | 6/2001 | Allard et al. ............... 705/26 |
| 6,253,188 | B1 * | 6/2001 | Witek et al. ................. 705/1 |
| 6,332,146 | B1 * | 12/2001 | Jebens et al. ............. 144/28.1 |
| 6,370,581 | B2 * | 4/2002 | Rader ........................ 709/230 |
| 6,487,723 | B1 * | 11/2002 | MacInnis ................... 725/132 |
| 2002/0107761 | A1 * | 8/2002 | Kark et al. .................. 705/27 |
| 2003/0069812 | A1 * | 4/2003 | Yuen et al. .................. 705/27 |

OTHER PUBLICATIONS

Houts, E. "Easy Web catalog publishing" InfoWorld, vol. 19, No. 12 (Mar. 24, 1997).*

King, N. "Web Store" PC Magazine, vol. 19, No. 18 (Oct. 17, 2000) p. 154.*

"InPart Launches Innovative FlashModeler at IMTS Show; Key Manufacturing Customers Can Instantly Access 3D Solid Models at No Cost," Business Wire (Sep. 16, 1998).*

Cardonet1, "Newark electronics selects cardonet supplier product to streamline e-catalog distribution" PR Newswire, dated Feb. 15, 2006.*

Cardonet2, Cardonet introduces cardonet supplier for efficient B2B catalog management and delivery, cardonet press release, dated Oct. 17, 2000.*

Cardonet3, http://web.archive.org/web/20001212224300/www.cardonet.com/solutions/supplier/index, dated Dec. 12, 2000.*

Cardonet4, http://web.archive.org/web/20010124065600/www.cardonet.com/solutions/supplier/solutio . . . , dated Jan. 24, 2001.*

Cardonet5, "Content Management: The next generation?", PR Newswire, dated Dec. 19, 2000.*

Gartner, "understanding catalogs in the commerce stream", dated Jan. 24, 2001.*

S. Khoshafian, A.B. Baker, Multimedia and Imaging Databases, 1996, Morgan Kaufmann Publishers, Inc., San Francisco, California, pp. 440-442.

* cited by examiner

FIG. 4

Example Main Data File

| Record # | Stock Number | Brand | Description | 50 Hz | Made in the USA |
|---|---|---|---|---|---|
| 1 | 1A123 | Ranco | Yellow Light Barricade, Hard Plastic | N | N |
| 2 | 2P100 | Swan | Yellow Soaker Hose, 1/4 inch Opening | N | Y |
| 3 | 3K015 | Dayton | 1/4 HP Capacitor Start Motor, Reversible, 1725 RPM | Y | Y |
| 4 | 5X808 | 3M | Yellow Hard Hat, Plastic | N | Y |

FIG. 6

Example of Data Structures for Binary Attributes

| Implied Record # | Binary Attribute Value |
|---|---|
| 1 | N |
| 2 | N |
| 3 | Y |
| 4 | Y |
| 5 | N |
| 6 | Y |
| 7 | Y |
| 8 | Y |

26

Binary  (Variable number of records), Record Number in Attribute Table/Main Data Table
Attribute Value  where attribute appears.

| N | 1 | 2 | 5 | ... | | | |
|---|---|---|---|---|---|---|---|
| Y | 3 | 4 | 6 | 7 | 8 | ... | |

28

(sorted down) (sorted →)

FIG. 7

| Implied Record # | Enumerated Attribute Value |
|---|---|
| 1 | 3M |
| 2 | DAYTON |
| 3 | DAYTON |
| 4 | KLEIN |
| 5 | WESTWARD |
| 6 | WESTWARD |
| 7 | WESTWARD |
| 8 | WESTWARD |

(26)

Enumerated    (Variable number of records), Record Number in Attribute Table/Main Data Table
Attribute Value  Freq.  where Enumerated attribute appears.

| | | | | | | | |
|---|---|---|---|---|---|---|---|
| 3M | 1 | 1 | ... | | | | |
| DAYTON | 2 | 2 | 3 | ... | | | |
| KLEIN | 1 | 4 | ... | | | | |
| WESTWARD | 4 | 5 | 6 | 7 | 8 | ... | |

(sorted down)    (sorted →)

Configuration Interface

```xml
<?xml version='1.0' encoding='us-ascii'?>
>!-- configuration file for product matcher -->
<productmatcher>
<entity name="MotorMatch" file="Motors.csv" type="string" attributes="7" delimiter="|" >
    <attribute name="ITEMNUM" alias="ITEMNUM" columns="1"/>
    <attribute name="MOTORTYPE" alias="Motor Type" indexed="true" columns="1"/>
    <attribute name="RPM" alias="RPM" indexed="true" columns="2">
        <column name="RPMDISP" sort="false"/>
        <column name="RPMSORT" sort="true"/>
    </attribute>
    <attribute name="HP" alias="HP" indexed="true" columns="2">
        <column name="HPDISP" sort="false"/>
        <column name="HPSORT" sort="true"/>
    </attribute>
    <attribute name="VOLTS" alias="VOLTS" indexed="true" columns="1"/>
    <attribute name="ENCLOSURE" alias="ENCLOSURE" indexed="true" columns="1"/>
    <attribute name="NEMAFRAME" alias="NEMA FRAME" indexed="true" columns="1"/>
</entity>
</entity name="CasterMatch" file="CASTFIN1.csv" type="bit mask" attributes="5" delimiter=",">
    <attribute name="ITEMNUM" alias="ITEMNUM" columns="1">
        <attribute name="SECTIONCOD" alias="Application Duty" indexed="true" columns="1"/>
    <attribute name="MOUNTTYPE" alias="Mounting Type" indexed="true" columns="1"/>
    <attribute name="WMATRLTYPE" alias="Material Type" indexed="true" columns="1"/>
    <attribute name="DIAMETER(mm)" alias="Wheel Diameter" indexed="true" columns="2">
        <column name="NSFDIAM" sort="false"/>
        <column name="NEWDIAM" sort="true"/>
    </attribute>
</entity>
```

FIG. 9

```
<entity name="B-LAVA" file="blava.qsc" attributes="19" type="int" delimiter="|" >
    <attribute name="ISMCMASTER" datatype="text" indexed="true" alias="ISMACMASTER" isyn="true" columns="1"/>
    <attribute name="ISMSC" datatype="text" indexed="true" alias="ISMSC" isyn="true" columns="1"/>
    <attribute name="ISSEARS" datatype="text" indexed="true" alias="ISSEARS" isyn="true" columns="1"/>
    <attribute name="ISMGN" datatype="text" indexed="true" alias="ISMGN" isyn="true" columns="1"/>
    <attribute name="ISLINEEXT" datatype="text" indexed="true" alias="ISLINEEXT" isyn="true" columns="1"/>
    <attribute name="ISCIRCLEE" datatype="text" indexed="true" alias="ISCIRCLEE" isyn="true" columns="1"/>
    <attribute name="ISENERGYRT" datatype="text" indexed="true" alias="ISENGERYRT" isyn="true" columns="1"/>
    <attribute name="ISDIVERSE" datatype="text" indexed="true" alias="ISDIVERSE" isyn="true" columns="1"/>
    <attribute name="ISWWGBRAND" datatype="text" indexed="true" alias="ISWWGBRAND" isyn="true" columns="1"/>
    <attribute name="ISFIFTYHZ" datatype="text" indexed="true" alias="ISFFTYHZ" isyn="true" columns="1"/>
    <attribute name="ISJAPANESE" datatype="text" indexed="true" alias="ISJAPANESE" isyn="true" columns="1"/>
    <attribute name="ISS" alias="ISS" datatype="text" indexed="true" isyn="true" columns="1"/>
    <attribute name="ISCORDLESS" alias="ISCORDLESS" datatype="text" indexed="true" isyn="true" columns="1"/>
    <attribute name="ISDISCONT" alias="ISDISCONT" datatype="text" indexed="true" isyn="true" columns="1"/>
    <attribute name="SEGMENT" alias="SEGMENT" datatype="text" indexed="true" columns="1"/>
    <attribute name="SUBCAT" alias="SUBCAT" datatype="text" indexed="true" columns="1"/>
    <attribute name="BRAND" alias="BRAND" datatype="text" indexed="true" columns="1"/>
    <attribute name="FAMILY" alias="FAMILY" datatype="text" indexed="true" columns="1"/>
    <attribute name="AVAIL" alias="AVAIL" datatype="text" indexed="true" columns="1"/>
</entity>
</productmatcher>
```

FIG. 9 (Continued)

| First Data Field | Second Data Field | Third Data Field | | | |
|---|---|---|---|---|---|
| Barricade | 1 | 1 | | | |
| Hard | 1 | 1 | | | |
| Light | 1 | 1 | | | |
| Plastic | 1 | 1 | | | |
| Yellow | 2 | 1 | 2 | | |

— 28

| First Data Field | Second Data Field | Third Data Field | | | |
|---|---|---|---|---|---|
| Barricade | 1 | 1 | | | |
| Hard | 1 | 1 | | | |
| Light | 1 | 1 | | | |
| Plastic | 1 | 1 | | | |
| Soaker | 1 | 2 | | | |
| Yellow | 2 | 1 | 2 | | |

— 28

| First Data Field | Second Data Field | Third Data Field | | | |
|---|---|---|---|---|---|
| Barricade | 1 | 1 | | | |
| Hard | 1 | 1 | | | |
| Hose | 1 | 2 | | | |
| Light | 1 | 1 | | | |
| Plastic | 1 | 1 | | | |
| Soaker | 1 | 2 | | | |
| Yellow | 2 | 1 | 2 | | |

— 28

| First Data Field | Second Data Field | Third Data Field | | | |
|---|---|---|---|---|---|
| 1/4 | 1 | 2 | | | |
| Barricade | 1 | 1 | | | |
| Hard | 1 | 1 | | | |
| Hose | 1 | 2 | | | |
| Light | 1 | 1 | | | |
| Plastic | 1 | 1 | | | |
| Soaker | 1 | 2 | | | |
| Yellow | 2 | 1 | 2 | | |

— 28

| First Data Field | Second Data Field | Third Data Field | | | |
|---|---|---|---|---|---|
| 1/4 | 1 | 2 | | | |
| Barricade | 1 | 1 | | | |
| Hard | 1 | 1 | | | |
| Hose | 1 | 2 | | | |
| Inch | 1 | 2 | | | |
| Light | 1 | 1 | | | |
| Plastic | 1 | 1 | | | |
| Soaker | 1 | 2 | | | |
| Yellow | 2 | 1 | 2 | | |

| First Data Field | Second Data Field | Third Data Field | | | |
|---|---|---|---|---|---|
| 1/4 | 1 | 2 | | | |
| Barricade | 1 | 1 | | | |
| Hard | 1 | 1 | | | |
| Hose | 1 | 2 | | | |
| Inch | 1 | 2 | | | |
| Light | 1 | 1 | | | |
| Opening | | 2 | | | |
| Plastic | 1 | 1 | | | |
| Socker | 1 | 2 | | | |
| Yellow | 2 | 1 | 2 | | |

FIG. 10b (Continued)

| First Data Field | Second Data Field | Third Data Field | | | |
|---|---|---|---|---|---|
| 1/4 | 2 | 2 | 3 | | |
| 1725 | 1 | 3 | | | |
| Barricade | 1 | 1 | | | |
| Capacitor | 1 | 3 | | | |
| Hard | 2 | 1 | 4 | | |
| Hat | 1 | 4 | | | |
| Hose | 1 | 2 | | | |
| Hp | 1 | 3 | | | |
| Light | 1 | 1 | | | |
| Motor | 1 | 3 | | | |
| Opening | 1 | 2 | | | |
| Plastic | 2 | 1 | 4 | | |
| Reversible | 1 | 3 | | | |
| Rpm | 1 | 3 | | | |
| Soaker | 1 | 2 | | | |
| Start | 1 | 3 | | | |
| Yellow | 3 | 1 | 2 | 4 | |
| (sorted down) | (sorted →) | | | | 28 |

FIG. 10c

SYSTEM AND METHOD FOR CREATING A CUSTOMIZED ELECTRONIC CATALOG

RELATED APPLICATION

This subject application is a continuation of, and claims priority to under 35 U.S.C. § 120, U.S. application Ser. No. 09/877,604, entitled "System And Method For Retrieving Information From An Electronic Catalog," filed on Jun. 8, 2001 now abandoned by Song and Westphal.

BACKGROUND OF THE INVENTION

This invention relates generally to systems and methods for conducting electronic commerce and, more particularly, relates to a system and method for interacting with an electronic catalog.

The recent development of the Internet has caused many retailers and suppliers to enter the electronic-business forum and offer their products for sale via the Internet. In order to facilitate the sale of their products via the Internet, these retailers and supplies typically provide online catalogs which identify and describe their products. The method for searching for products within these electronically stored catalogs is, however, different than the methods that are traditionally used when searching for products listed in a printed catalog. In this regard, search engines have been the most common means employed for searching electronic catalogs. However, retailers and suppliers have struggled to develop search engines that are easy to use and that also provide accurate and useful results on a substantially real-time basis. In fact, currently known search engines are often times frustrating to use and provide less than optimal results.

To initiate the searching process, many search engines allow users to enter keywords. Typically, these search engines process the keywords that are entered by the user and, in response, conduct input/output ("I/O") function calls at a server computer to obtain the search results. While the keyword search methodology is effective for searching product catalogs with small inventories, conducting searches using I/O function calls is time consuming and less efficient for retailers and suppliers that offer many different products.

Additionally, many retailers and suppliers offer multiple products that include identical or virtually identical product names or descriptions. Thus, when a keyword search is conducted, the search is likely to generate a large list of products that match the entered keywords. This requires that the results of the search be carefully reviewed by the party conducting the search, or that the search be re-executed with keywords that are aimed at producing a narrower set of search results. Therefore, the keyword search methodology is seen to have limited use in that it is most effective when performing searches within product catalogs that have products that have easily distinguishable descriptive attributes. Unfortunately, most electronic product catalogs are voluminous and have numerous products with the same or similar attributes.

A known alternative to search techniques that utilize I/O function calls when conducting searches is to provide a lookup module that stores substantially all of the search database in the local memory of a computer. This type of search, however, is limited to word processing applications where users have the option of employing a dictionary look-up function or a thesaurus look-up function. While these search techniques enable a search to be conducted in a relatively fast time frame, as a result of storing part of the search database in the local memory, these search techniques have not been employed to search product catalogs which are presently too large to be stored in local memory when compared to electronic dictionaries and thesauruses.

From the foregoing, it is seen that a need remains for an improved system and method for conducting online searches of product catalogs. In particular, a need exists for a system and method for conducting online searches of large product catalogs that is easy to use and that also provides accurate and useful results on a timely basis.

SUMMARY OF THE INVENTION

In accordance with these needs, the present invention is embodied in a system and method for creating a searchable representation of an electronic catalog. Generally, the searchable representation of the electronic catalog includes one or more search data structures each having one or more search data records. The search data records include a first data field containing data representing an attribute of a product within the electronic catalog, a second data field containing data representing the number of times the attribute is used in connection with any product within the electronic catalog, and one or more additional data field each containing data representing a record address within the electronic catalog at which data pertaining to each product having the attribute is stored.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF DRAWINGS

For a better understanding of the invention, reference may be had to a preferred embodiment shown in the following drawings in which:

FIG. 4 is a Web page depicting a user interface displaying the results of an exemplary search resulting from the clicking of the searchable attribute "Westward" as shown in FIG. 3;

FIG. 6 is an exemplary main data file depicting product records for an electronic catalog, including fields for "record number," "stock number," "brand," "description," "50 Hertz" and "Made in the USA";

FIG. 7 is a portion of an exemplary main data file depicting binary attributes and an exemplary search data structure of a searchable, electronic catalog which is representative of the portion of the main data file and which is created in accordance with the subject invention;

FIG. 8 is a portion of an exemplary main data file depicting enumerated attributes and an exemplary search data structure of a searchable, electronic catalog which is representative of the portion of the main data file and which is created in accordance with the subject invention FIG. 9 is a portion of the XML listing used in providing a configuration interface;

FIG. 10b shows a series of exemplary records that are created by the data preprocessor/configuration interface after processing a second product record in the main data file, the exemplary records including additional record numbers in the third data field for attributes contained in the second product record;

FIG. 10c shows a series of exemplary records that are created by the data preprocessor/configuration interface after processing all of the product records in the main data file, the exemplary records including additional record numbers in the third data field for attributes contained in a third and fourth product record;

DETAILED DESCRIPTION

Figure 1:
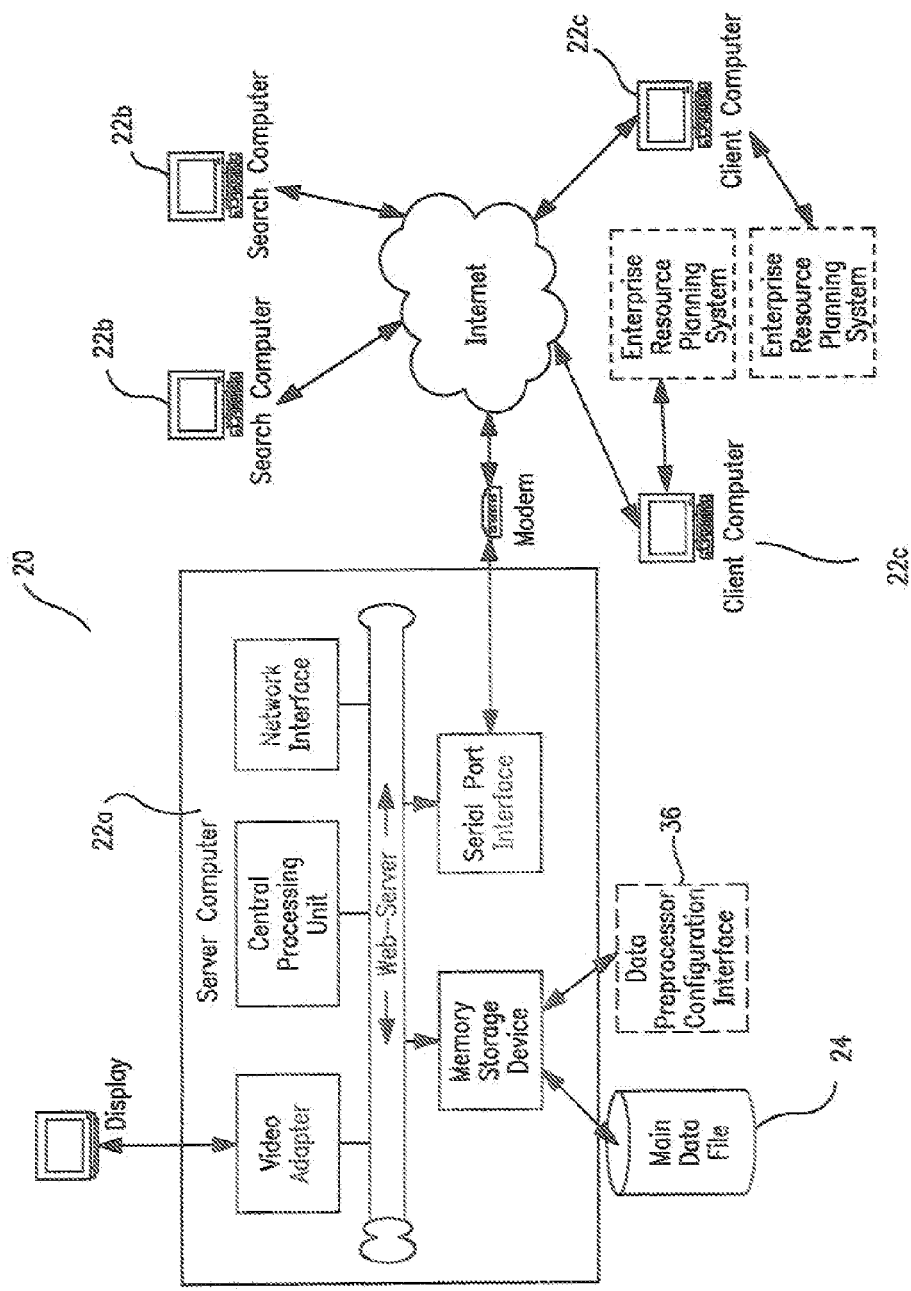
FIG. 1 is a diagram illustrating an exemplary system for conducting searches in accordance with the invention described herein.
Figure 2:
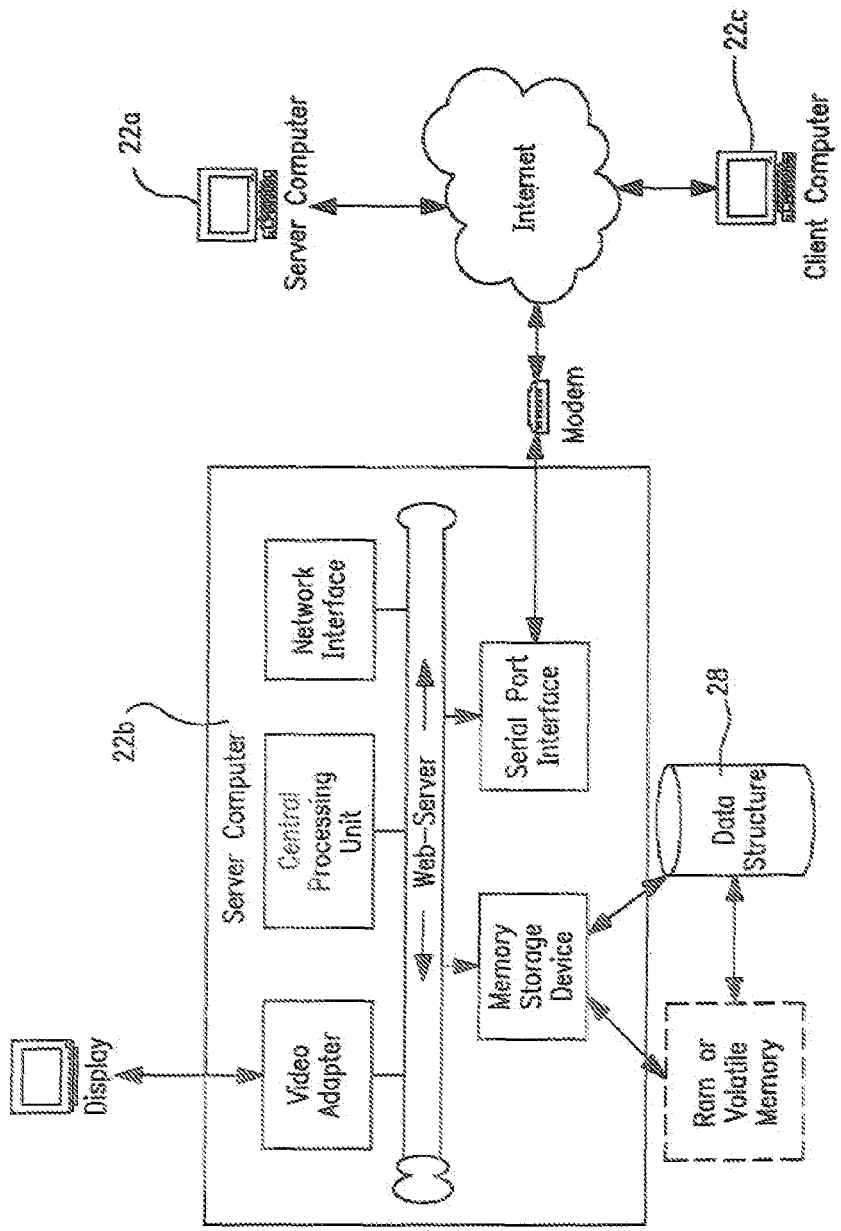
FIG. 2 is a diagram illustrating exemplary components at the search computer within the system illustrated in FIG. 1 and its interaction with a server computer and a client computer.

Turning now to the Figures, wherein like reference numerals refer to like elements, there is illustrated a system and method for interacting with an online or electronic catalog. Although not required, the system and method will be described in the general context of a computer network 20, illustrated in FIG. 1, and computer executable instructions being executed by general purpose computing devices within the computer network 20. In this regard, the general purpose computing devices may comprise one or more server computers 22a, which include a main data file 24, one or more search computers 22b, which include a searchable (as shown in FIG. 2), electronic catalog in the form of one or more search data structures 28, and one or more user or client computers 22c by which users can access and retrieve information from the searchable, electronic catalog. As will be appreciated by those of skill in the art, the general purpose computing devices need not be limited to personal computers, but may include hand-held devices, multiprocessor systems, microprocessor-based or programmable consumer electronics, minicomputers, mainframe computers, personal digital assistants, cellular telephones or the like depending upon their intended end use within the system.

For performing the procedures described hereinafter, the computer executable instructions may be written as routines, programs, objects, components, and/or data structures that perform particular tasks. Within the computer network 20, the computer executable instructions may reside on a single general purpose computing device or the tasks performed by the computer executable instructions may be distributed among a plurality of the general purpose computing devices. Therefore, while described in the context of a computer network, the present invention may be embodied in a stand-alone, general purpose computing device that need not be connected to a network.

To perform the particular tasks in accordance with the computer executable instructions, the general purpose computing devices may include, as needed, a video adapter, a processing unit, a system memory, and a system bus that couples the system memory to the processing unit. The video adapter allows the general purpose computing devices to support a display, such as a cathode ray tube ("CRT"), a liquid crystal display ("LCD"), a flat screen monitor, a touch screen monitor or similar means for displaying textual and graphical data to a user. The display allows a user to view information such as the keyword and drill-down search attributes, search results for particular search requests, system maintenance screens, etc.

The general purpose computing devices may further include read only memory (ROM), a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of the computer executable instructions and any other data structures, program modules, etc. utilized during the operation of the general purpose computing devices. In addition, to provide improved searching speed by eliminating the need to perform I/O function calls, the search computer(s) 22b will include random access memory ("RAM") or similar volatile memory in which the subject searchable, electronic catalog is preferably stored.

To connect the general purpose computing devices within the computer network 20, the general purpose computing devices may include a network interface or adapter. When used in a wide area network, such as the Internet, the general purpose computing devices typically include a modem or similar device. The modem, which may be internal or external, is connected to the system bus via a serial port interface. It will be appreciated that the described network connections are exemplary and that other means of establishing a communications link between the general purpose computing devices may be used. For example, the system may also include a wireless access interface that receives and transmits information via a wireless communications medium, such as, a cellular communications network, a satellite communications network, or other similar type of wireless network.

For use in creating the searchable, electronic catalog, a main data file 24 is provided which is preferably in the form of a traditional commercial database capable of being updated and maintained in conventional and existing manners. In this regard, the main data file 24 is preferably comprised of product records 24a wherein each product record is representative of an individual product, i.e., a unit of information in the electronic catalog. Furthermore each product record preferably includes data 26 stored in fields which data is representative of attributes of the product, i.e., features, descriptors, etc. For example, as shown in FIG. 6, the data may be organized within the main data file 24 using records having predefined fields such as, by way of example only, a "record number" field 25a, a "stock number" field 25b, a "brand" field 25c, a "description" field 25d, a "50 Hertz" field 25e, and a "Made in the USA" field 25f. For reasons that will become apparent, the fields within the main data file 24 are preferably selected so as to provide a means for logically categorizing the product attributes.

While the main data file 24 is preferably stored in one or more memory locations on one or more of the server computers 22a, it will be appreciated that the main data file 24 can also be stored on a single general purpose computing device on which the entirety or part of the system is embodied. Furthermore, to ensure that the searchable catalog contains the most up-to-date information, it is preferred that measures are taken to timely update the main data file 24 from which the searchable, electronic catalog is derived. To this end, the main data file 24 may be updated on a daily basis. This update would advantageously take place during non-peak search periods.

To create the searchable, electronic catalog from the information contained within the main data file 24, which also preferably takes place during non-peak search periods, the system includes a data preprocessor that cooperates with a configuration interface 36, an example of the configuration interface 36 is illustrated in FIG. 9, to create one or more search data structures 28. Generally, the configuration interface functions to define the search data structures 28, i.e., the records and fields within the search data structures 28. Accordingly, the configuration interface also determines into which search data structure 28 data from the main data file 24 is to be stored.

When storing data within the search data structures 28, the configuration interface may also be used to assign functionality to the data, e.g., whether the data in the field is displayable, whether the data within the field is a selectably searchable attribute, etc. By way of example, with reference to FIG. 9, data representative of an attribute 26 within the search data structure 28 might be displayable on a user computer 22c as an alphanumeric string, i.e., "Power Tool," while the internal, searchable representation of this attribute might be a hex value, i.e., 0x04. Thus, it will be appreciated that some searchable attributes, such as searchable attributes represented in binary form, are only utilized in connection with the search process described hereinafter.

As noted previously, the configuration interface 36 is used to dynamically assign each attribute 26 an internal representation data type within the search data structure, such as string, integer or bit mask. In this regard, since string types are slow and wasteful in terms of memory but well-suited for human-readable applications, strings should be used only to represent attributes that are to be displayed on the user computer 22c. On the other hand, since integers are fast and, therefore, a significant amount of logical comparisons can be performed in only a few CPU clock cycles, integers are a preferred internal representation type. Bit masks are also fast, but come in a close second to integers, due to some limitations associated with JAVA code, which is the preferred coding language. Nevertheless, if slight response time degradation is allowable, then the overall data structure "footprint" can be significantly reduced by using bit masks, especially when using binary attributes, e.g., yes/no or true/false.

As further noted above, the main data file 24 may be converted into several search data structures 28, such as a keyword search data structure, a "brand" search data structure, or other custom search data structures. The keyword search data structure may include a group of search records 30 comprised of attributes 26 that are stored within data fields within the main data file 24 as text. The brand search data structure may include a group of search records 30 comprised of search attributes 26 that are taken from the specific "brand" field 25c of the main data file 24. A custom search data structures may further include additional categories of search data structures, such as, search data structures 28 that include search records for products that are "made in the USA" or products that are "safe for children." These custom search data structures 28 may include a group of search records 30 comprised of attributes 26 that are taken from the respective predefined fields of the main data file 24.

Figure 10A:
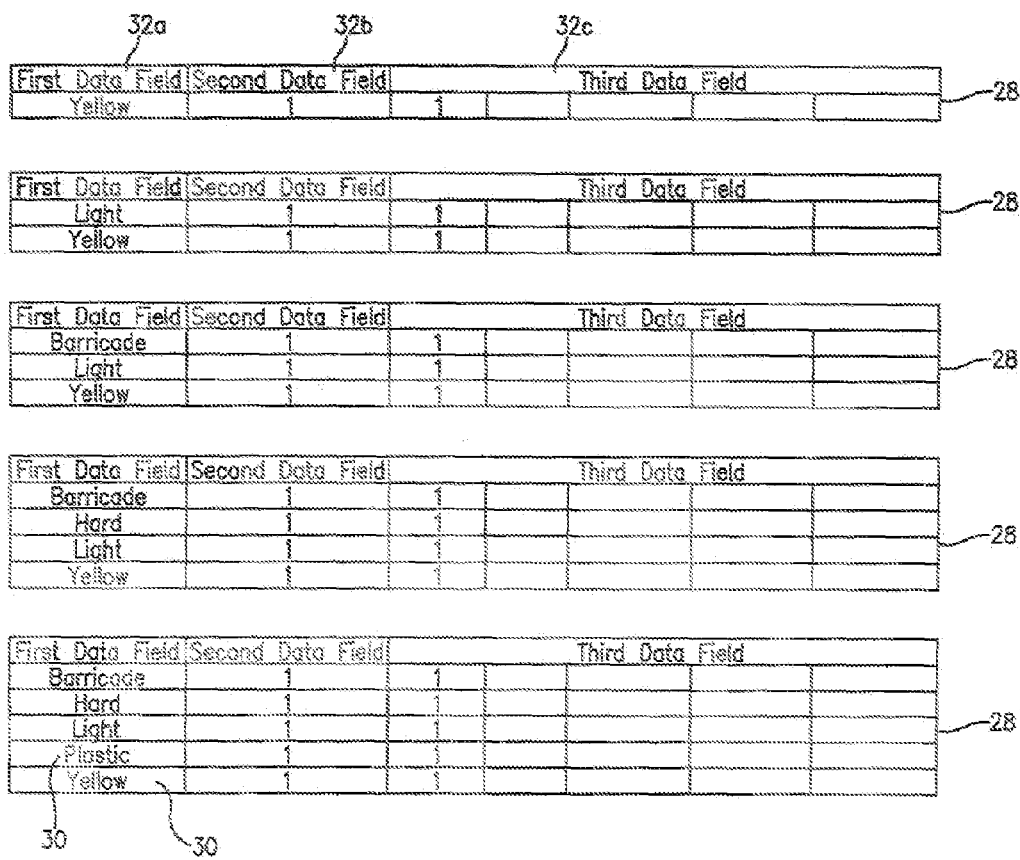
FIG. 10a shows a series of exemplary records that are created by a data preprocessor/configuration interface after processing a first product record in the main data file, the exemplary records including a first data field, a second data field and a third data field.

The search records 30 are further comprised of a plurality of data fields. For example, each search record 30 may be comprised of a first data field 32a, a second data field 32b and a third data field 32c. The first data field 32a of the search data structure 28 may contain the literal value of a particular search attribute 26 or its JAVA representation. As shown in FIGS. 10a-10c, the first data field may be generated in a sorted order. In addition, the first data field 32a may be a binary representation of an attribute (as shown in FIG. 7), which means that this data field 32a can assume only one of two types of values, i.e., true/yes (has the attribute) or false/no (does not have the attribute). On the other hand, if the first data field 32a can assume one of several different predefined values, such as white, black, or yellow (as shown in FIG. 8), the first data field 32a can have an enumerated value representative of the one of the predefined attribute values. The second data field 32b contains the number of times the attribute appears in the main data file 24. The third data field 32c preferably contains the record address in the main data file 24 where the particular search attribute 26 appears. Further, the third data field 32c may include a variable number of data fields dependent upon the number of records in which the attribute 26 appears in the main data file 24.

A fourth data field is optional and may include an index that represents a range of values, the range of values including a value equivalent to that values contained within the first data field 32b of the search records 30, such as an RPM value; thus, as shown in Table A, the configuration interface 36 may populate the fourth data field with a selectable index. The selectable index may be displayed on the client computer 22c as a drill-down menu selection or as a hyperlink, and chosen by the client computer 22c similar to other selectable attributes 26b. The first data field 32a, the fourth data field and the collection of record addresses that may exist in the third data field 32c may also be provided in sorted order.

TABLE A

| Indexed Value (fourth data field) | Display Value (first data field) | Freq. (second data field) | Variable Number of Record Numbers Where this Dictionary Word Appears in Main Data File (third data field) | third data field cont. | third data field cont. | third data field cont. |
|---|---|---|---|---|---|---|
| 500 to 1199 | 550 | 1 | 56 | . . . | | |
| 1200 to 1499 | 1200 | 2 | 34 | 66 | . . . | |

TABLE A-continued

| Indexed Value (fourth data field) | Display Value (first data field) | Freq. (second data field) | Variable Number of Record Numbers Where this Dictionary Word Appears in Main Data File (third data field) | third data field cont. | third data field cont. | third data field cont. |
|---|---|---|---|---|---|---|
| 1500 to 1999 | 1625 | 3 | 27 | 58 | 88 | ... |
| 2000 to 2999 | 2550 | 1 | 22 | ... | | |

The sorted order of the first data field 32a, the third data field 32c and the fourth data field 32d allows in-place searches to be conducted, that is, searches can be conducted without requiring additional indexes to perform the search. An in-place binary or interpolation search may be performed by knowing the memory address in which each search record 30 begins and ends. Although not required, the data fields 32 of the search records 30 are stored as read-only data. Thus, traditional database activities, such as live updates, record locking, record validation and foreign key constraints are not available; this decreases the memory and processing requirements for the search computers 22b, thereby increasing the speed and efficiency of the system 10 while also allowing the searchable, electronic catalog to be maintained in volatile memory.

As exemplified in FIGS. 11 and 10a-10c, to create the search data structures 28a, the data preprocessor, as directed by the configuration interface 36, uploads a first attribute 26a from a selected predefined field 25 of the main data file 24 into the first data field 32a of a first search record 30a for a particular search data structure (as designated by the configuration interface), adds one to the second data field 32b of the first search record, and appends the record address of the record in the main data file 24 in which the first attribute appears into a third data field 32c of the first search record 30a.

The data preprocessor then compares a second attribute 26b from the selected field in the main data file 24 to the attribute represented within the first data field 32a of the first search record 30a. If the data preprocessor determines that the second attribute 26b and attribute represented in the first data field 32a of the first search record 30a are the same, the second data field 32b of the first search record 30a is increased by one and the record address within the main data file 24 in which the second attribute 26b is found is appended as an additional third data field 32c to the first search record 30a. If, however, the configuration interface 36 determines that the second attribute 26b and attribute represented within the first data field 32a of the first search record 30A are different, the second attribute 26b is read into the first data field 32a of a second search record 30b, its second data field is increased by one, and a third data field is appended to the second search record which includes a representation of the record within the main data file 24 in which the second attribute is found.

The data preprocessor will then process the next attribute 26c in the appropriate field within the main data file 24. If the data preprocessor determines that the next search attribute 26c and the attribute represented in the first data field 32a of the first search record 30a are the same, the number of occurrences represented within the second data field 32b of the first search record 30a is increased by one and the record address within the main data file 24 in which the currently considered attribute is found is appended as an additional third data field 32c to the corresponding search record 30a. If the next attribute 26c and attribute represented by the first data field 32a of the first search record 30a are different, then the data preprocessor will compare the next attribute 26c to the attribute represented in the first data field 32a of the second search record 30b. This process will continue to be performed until all attributes in the main data file 24 for the one or fields of interest have been considered and processed.

Figure 11:
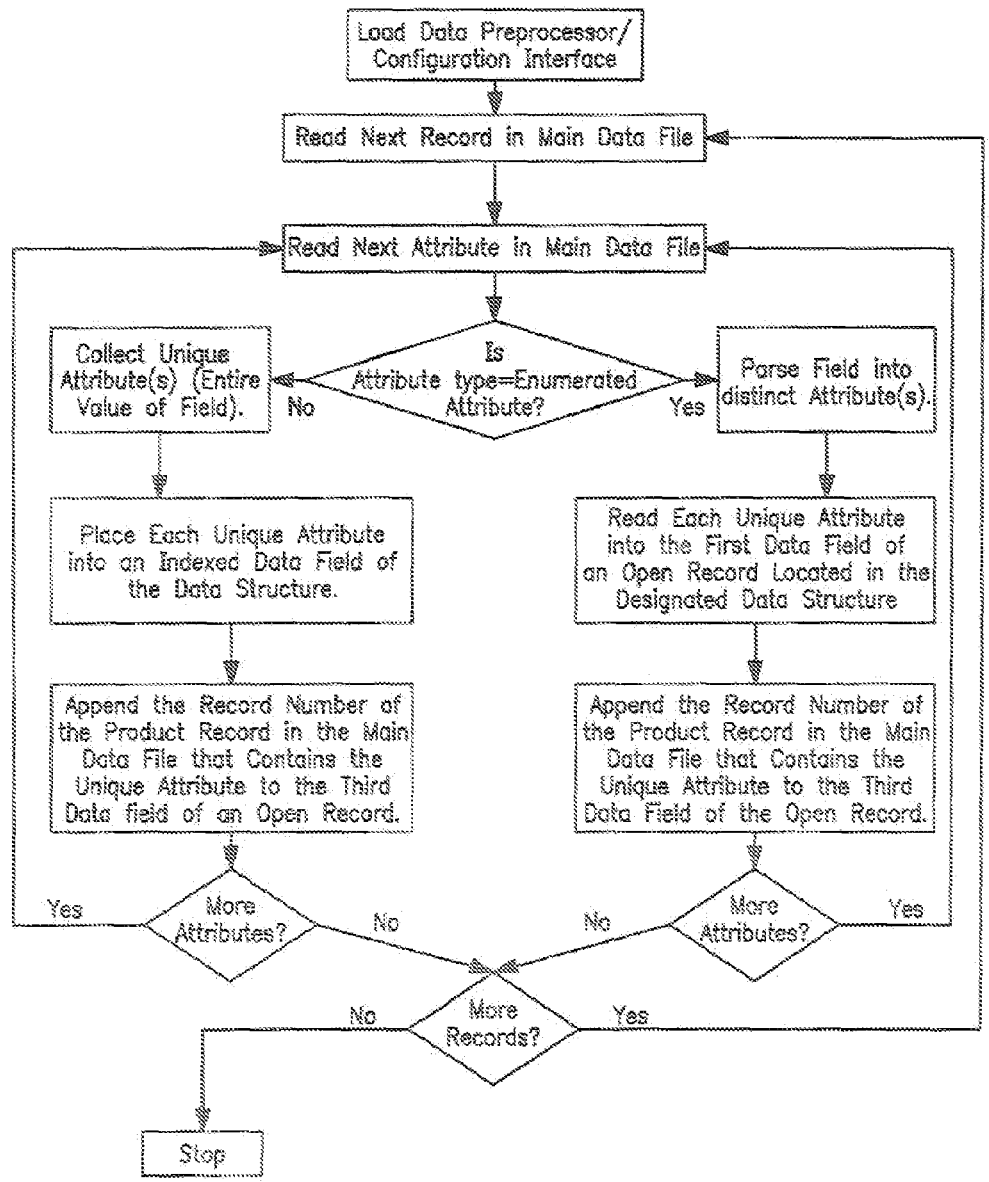
FIG. 11 is a diagram illustrating an exemplary method for use in converting the main data file into a searchable, electronic catalog.

By way of specific example, as shown in FIG. 11, to create a keyword search data structure 28a, the data preprocessor, as dictated by the configuration interface 36 will examine the data maintained in the fields of the main data file 24 that have been predetermined to contain textual information. When extracting the data from the fields, the data may be parsed to extract and consider each word separately. The words are compared as they are extracted against the words that have already been used to populate the keyword data structure in the manner described above. Thus, in accordance with this process, each of the unique words will have a corresponding record within the keyword search data structure 28a which will include a first data field having a representation of the word, a second data field having an indication of the number of records in which the word is found, and one or more third data fields having data indicative of the records within the main data file 24 in which the corresponding word attribute is set forth.

To gain access to the electronic catalog resident, the user computers 22c may be linked to the network 20 through enterprise resource planning system ("ERP") portals, enterprise asset management system ("ESM") portals, computerized maintenance management system ("CMMS") portals, or general Internet portals. In the case of ERPs, ESM, and CMMS, the user computer 22c indirectly accesses the electronic catalog by first establishing communication with an electronic-commerce system that, in turn, provides access to the server computer 22a. In the case of a general Internet portal, the user directly accesses the server computer 22a by, for example, clicking on a referring hyperlink in a displayed HTML page or by typing an Internet URL that functions to identify the server computer 22a.

Once a connection that will provide access to the searchable, electronic catalog is established, a search of the searchable, electronic catalog is performed in response to the user entering a search request on a search computers 22c. Based on the search attributes 26 entered or selected by the user, the server computer 22a forwards the search request 40 to a selected one of the search computers 22b on which is stored at least one of the search data structures 28. The search request may be distributed to one of the search computers 22b based upon configurable, weighted average load balancing. By distributing search requests according to this method, the computer network is better able to utilize its hardware and achieve a more balanced distribution of its load. Those with skill in the art should appreciate that other methods for distributing search requests could be employed, such as round robin distribution methods or similar methods for distributing search requests.

Figure 3:
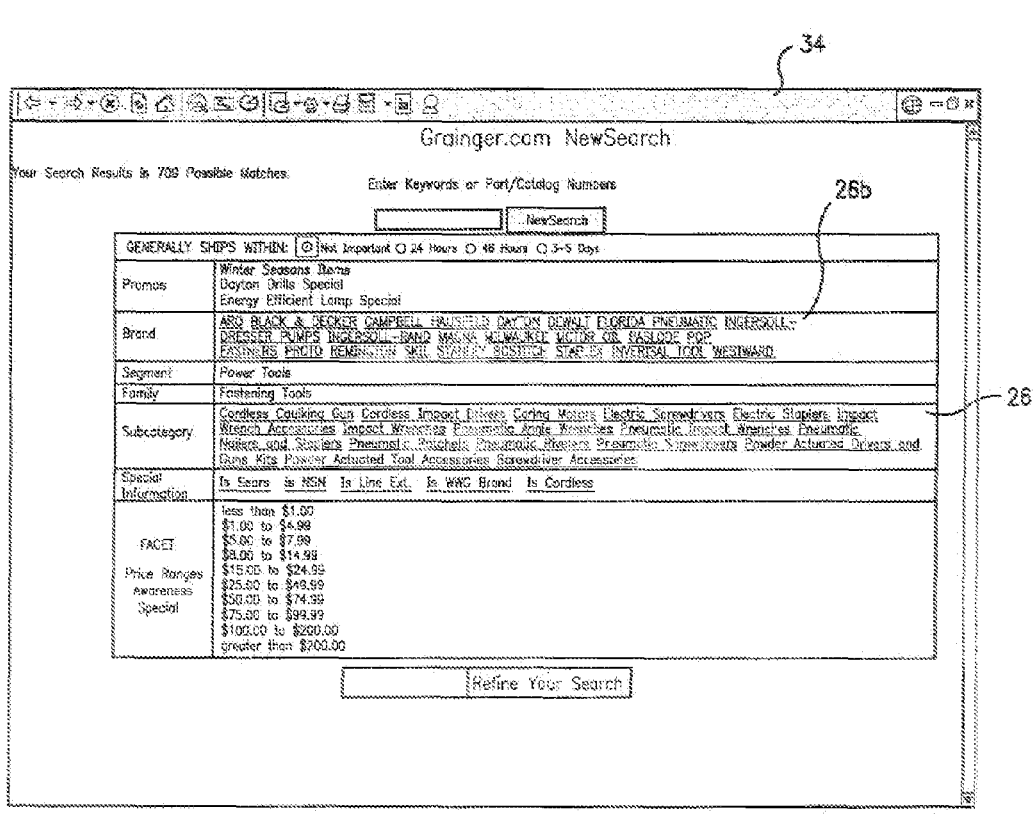
FIG. 3 is an exemplary Web page depicting a user interface displaying the results of an exemplary search.
Figure 4:
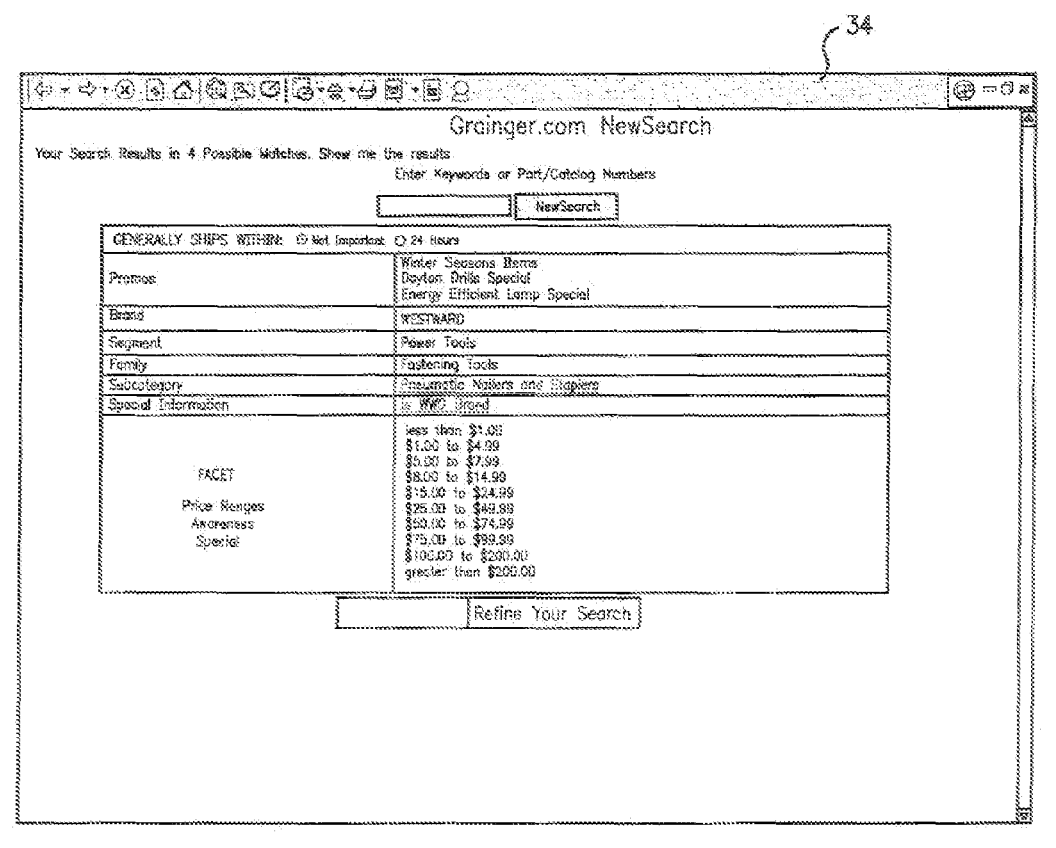
Figure 5:
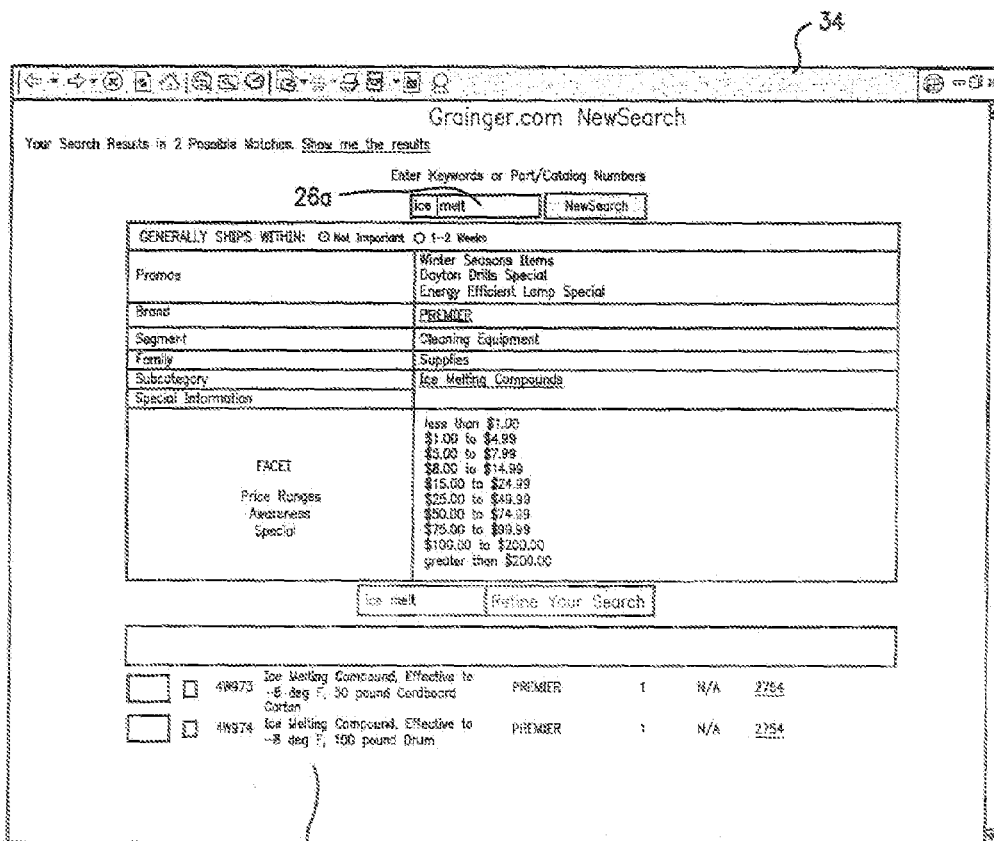
FIG. 5 is a Web page depicting a user interface displaying the results of yet another exemplary search.

To assist the user computer 22c in accessing the computer network 20 and submitting search requests, the user computer 22c includes a graphical user interface 34. As shown in FIGS. 3-5, search requests may be entered on the user computer 22b via the graphical user interface 34 as keywords or selected from drill-down menus, which may be provided by the graphical user interface 34. The graphical user interface 34 may also manage the following: (1) the content that the user interacts with; (2) search requests that are submitted by the user; (3) input and editing of a shopping cart by the user; and (4) selection of transaction options by the user. In this regard, the graphical user interface 34 of the Web server 22a generates Web pages that include pull down menus, text entry fields, etc. by which the user computer 22c may exchange search information with the Web server 22a.

Once a search request 40 is received at a server computer 22a, which search request is comprised of information representative of keywords or search attributes 26a selected using the graphical user interface, the user submitted search attributes 26a are compared to the data fields 32a of the search records 32 to find attributes 26 that match the search attributes. In performing the matching operation, the search computer 22b filters out search records 32 that do not include a match with the user submitted search attributes 26a. The search records 32 that do contain a match may then be examined to determine if the remaining search records 32 include selectable search attributes 26b that should be displayed on the user computer 22c by which the search can be refined. In this manner, each time the user clicks on a search attribute or supplies an additional keyword, irrelevant content is eliminated and only the attributes of relevant content remain. After each searching iteration, the search results 38 may then be displayed on the user computer 22c for purchase or additional searching.

More specifically, the following tables show detailed examples of how search requests 40 are processed by the search computer 22b. The following main data file 24, shown in Table 1, is provided for exemplary purposes only.

TABLE 1

| Record # | Stock Number | BRAND | Description | 50 Hz | MADE IN USA |
|---|---|---|---|---|---|
| 1 | 1A123 | Ranco | Yellow Light Barricade, Hard Plastic | N | N |
| 2 | 2P100 | Swan | Yellow Soaker Hose, ¼ inch Opening | N | Y |
| 3 | 3K015 | Dayton | ¼ HP Capacitor Start Motor, Reversible, 1725 RPM | Y | Y |
| 4 | 5X808 | 3M | Yellow Hard Hat, Plastic | N | Y |

As shown above, the highlighted column headings represent selectable search attributes 26b; selectable search attributes 26b may be displayed on the user computer 22c as drill-down menu selections or hyperlinks as illustrated in FIGS. 3-5. Thus, a search data structure 28 may exist for each of the selectable search attributes 26b. If the selectable search attribute 26b for "50 Hz" is chosen, the search computer will examine the search data structure that corresponds to the selected search attribute 26b. The search results 38 will include all the search records 32 which include "Y" as a search attribute 26. In this instance, the main data field 24 includes one matching search record, i.e., record number 3 of the main data file 24 as indicated in the third data field 32c of the second search record 28 of the "50 Hz" search data structure shown in Table 2.

TABLE 2

| First Data Field (50 Hz Attribute) | Second Data Field (Count) | Third Data Field | Third Data Field (Cont'd) | (Cont'd) |
|---|---|---|---|---|
| N | 3 | 1 | 2 | 4 |
| Y | 1 | 3 | | |

Next, the search computer will forward the search results 38 to the server computer 22A. The server computer will read the record number from the third data field 32c and examine this record in the main data file 24 for additional, selectable search attributes 26b that can be displayed on the user computer 22c for refinement of the search. It should also be understood, however, that the search computer 22b could also determine whether additional, selectable search attributes 26b exist without accessing the main data file 24. In the present example, record number 3 includes selectable search attributes for "Dayton" and "Made in the USA," shown as the highlighted search attributes in main data file 24 illustrated in Table 3 below. This means that the selectable search attributes for "Dayton" and "Made in the USA" can be displayed on the user computer for conducting additional search requests 40. In other words any selectable search attribute that includes a "Y" or an alphanumeric string can be displayed to the user computer as a drill-down menu selection or as a hyperlink for use in further refining a search. It is to be noted that, while these additional searchable selections can be presented to the user, since only one record from the main data file 24 matched the current search request, no further meaningful refinements will be made by actually clicking of the presented searchable attributes.

TABLE 3

| Record # | Stock Number | BRAND | Description | 50 Hz | MADE IN THE USA |
|---|---|---|---|---|---|
| 1 | 1A123 | Ranco | Yellow Light Barricade, Hard Plastic | N | N |
| 2 | 2P100 | Swan | Yellow Soaker Hose, ¼ inch Opening | N | Y |
| 3 | 3K015 | Dayton | ¼ HP Capacitor Start Motor, Reversible, 1725 RPM | Y | Y |
| 4 | 5X808 | 3M | Yellow Hard Hat, Plastic | N | Y |

The following tables are used to show a more detailed example of how multiple search requests 40 are processed by the search computer 22b. The main data file shown in Table 4 is used for exemplary purposes only.

TABLE 4

| Record # | Stock Number | BRAND | Description | 50 Hz | MADE IN THE USA |
|---|---|---|---|---|---|
| 1 | 1A123 | Ranco | Yellow Light Barricade, Hard Plastic | N | N |
| 2 | 2P100 | Swan | Yellow Soaker Hose, ¼ inch Opening | N | Y |
| 3 | 3K015 | Dayton | ¼ HP Capacitor Start Motor, Reversible, 1725 RPM | Y | Y |
| 4 | 5X808 | 3M | Yellow Hard Hat, Plastic | N | Y |

Again, the highlighted column headings represent selectable search attributes 26b, which are displayed on the user computer 22c. Hyperlinks for "Ranco," "Swan," "Dayton" and "3M" may also be displayed on the user computer 22c. Thus, a search data structure 28 may exist for each of the selectable search attributes 26b, i.e., "Ranco," "Swan," "Dayton," "3M," "50 Hz" and "Made in the USA." In the present example, the selectable search attributes 26b for "Made in the USA" is chosen. Therefore, the search computer 22b will examine the "made in the USA" search data structure which corresponds to the selected search attribute 26b. The search results 38 will include all the search records 32 which are indicated to have a "Y," i.e., the product is made in the USA, as an attribute 26. As shown in Table 5, the main data field 24 includes three matching search records, i.e., record numbers 2, 3 and 4 as indicated in the third data field 32b of the "made in the USA" search record illustrated therein.

TABLE 5

| First Data Field (Made in USA) | Second Data Field (Count) | Third Data Field | | |
|---|---|---|---|---|
| N | 1 | 1 | | |
| Y | 3 | 2 | 3 | 4 |

Next, the search computer 22b will forward the search results 38 to the server computer 22a. The server computer 22a will read the record numbers from the third data field 32c and examine these record in the main data file 24 to determine if any additional, selectable search attributes 26b are available to be displayed on the user computer 22c. It should also be understood, however, that the search computer 22b could also determine whether additional, selectable search attributes 26b exist without accessing the main data file 24. In the present example, since record numbers 2, 3 and 4 include selectable search attributes for the brands "Swan," "Dayton," and "3M" and a selectable search attribute for "50 Hz" as illustrated in Table 6, the clickable, selectable search attributes 26b for "Swan," "Dayton," "3M" and "50 Hz" can be displayed on the user computer for conducting additional search requests 40.

TABLE 6

| Record # | Stock Number | BRAND | Description | 50 Hz | MADE IN THE USA |
|---|---|---|---|---|---|
| 1 | 1A123 | Ranco | Yellow Light Barricade, Hard Plastic | N | N |
| 2 | 2P100 | Swan | Yellow Soaker Hose, ¼ inch Opening | N | Y |
| 3 | 3K015 | Dayton | ¼ HP Capacitor Start Motor, Reversible, 1725 RPM | Y | Y |
| 4 | 5X808 | 3M | Yellow Hard Hat, Plastic | N | Y |

The "Made in the USA" selectable search attribute 26a will not be displayed on the user computer 22c since it was already selected and selectable search attributes should not be made available for selection more than once.

Assuming that the selectable search attribute for "Swan" is next selected, the search computer 22b will use the search data structure 28 for "Brands" (shown in Table 7) to retrieve all records including the brand "Swan." As shown in Table 7, only record number 2 is a match.

TABLE 7

| First Data Field (Brand Attribute) | Second Data Field (Count) | Third Data Field |
|---|---|---|
| 3M | 1 | 4 |
| Dayton | 1 | 3 |
| Ranco | 1 | 1 |
| Swan | 1 | 2 |

The search computer 22b then recalls the search results from the first search request, i.e., record numbers 2, 3 and 4, and the search results from the second search request, i.e., record number 2. An intersection or join function is then applied to both sets of search results. An intersection of the search results provides only one matching search record, i.e., record number 2 from the main data file 24, as highlighted in Table 8.

TABLE 8

| Record # | Stock Number | BRAND | Description | 50 Hz | MADE IN USA |
|---|---|---|---|---|---|
| 1 | 1A123 | Ranco | Yellow Light Barricade, Hard Plastic | N | N |
| 2 | 2P100 | Swan | Yellow Soaker Hose, ¼ inch Opening | N | Y |
| 3 | 3K015 | Dayton | ¼ HP Capacitor Start Motor, Reversible, 1725 RPM | Y | Y |
| 4 | 5X808 | 3M | Yellow Hard Hat, Plastic | N | Y |

As a note of significance, these search results all reside in memory. Because of the data preprocessing step, the main data file may be represented indirectly with the third data field. This field consists of efficient integers. In this way, intersections of any number of search results, corresponding to a one or more selected attributes, can be performed entirely in RAM. This forgoes the need of working with traditional database intersection functions that rely on non-volatile storage.

Figure 12:
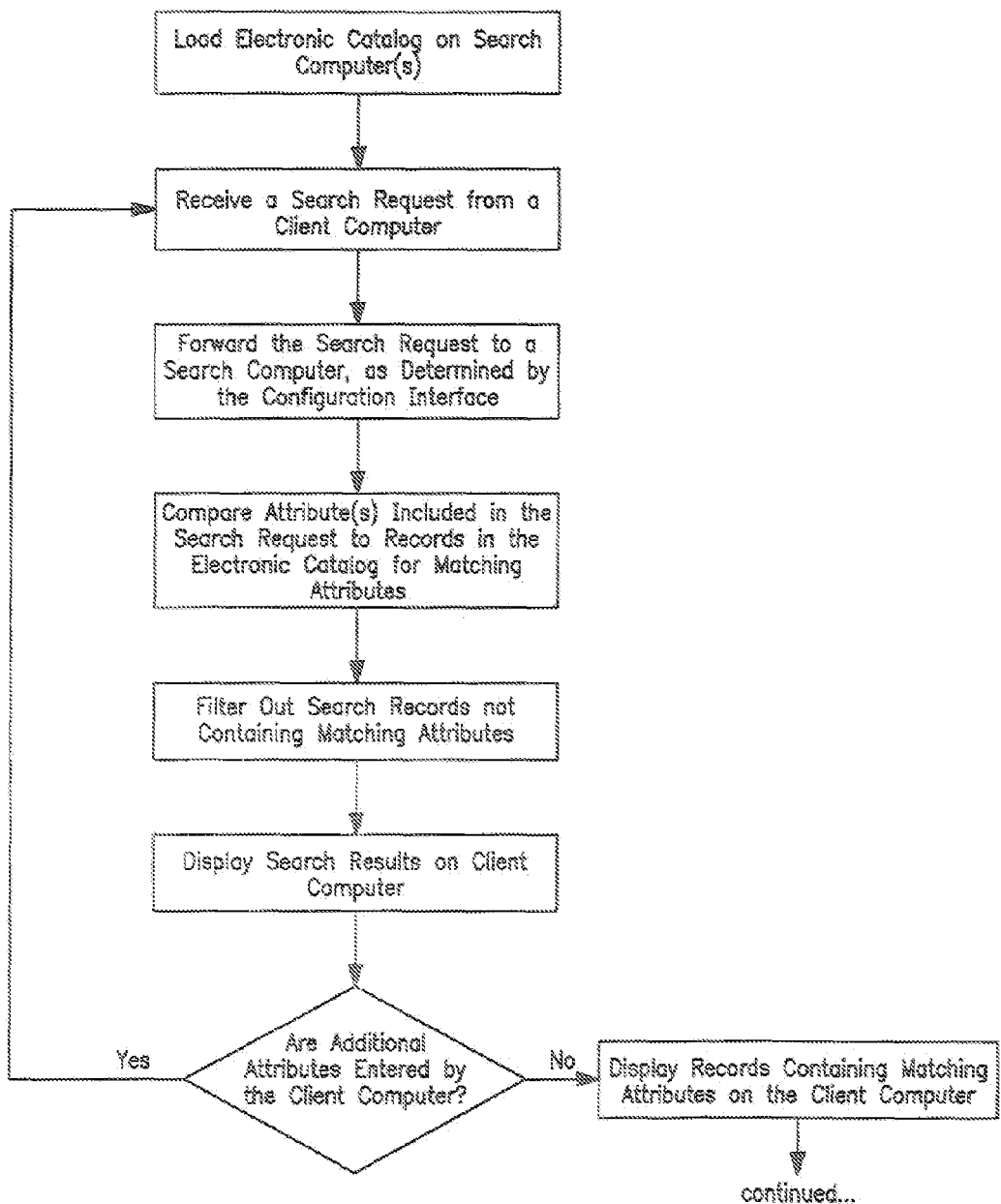
FIG. 12 is a diagram illustrating an exemplary method for processing search requests at a search computer and downloading search results to a client computer.
Figure 12:
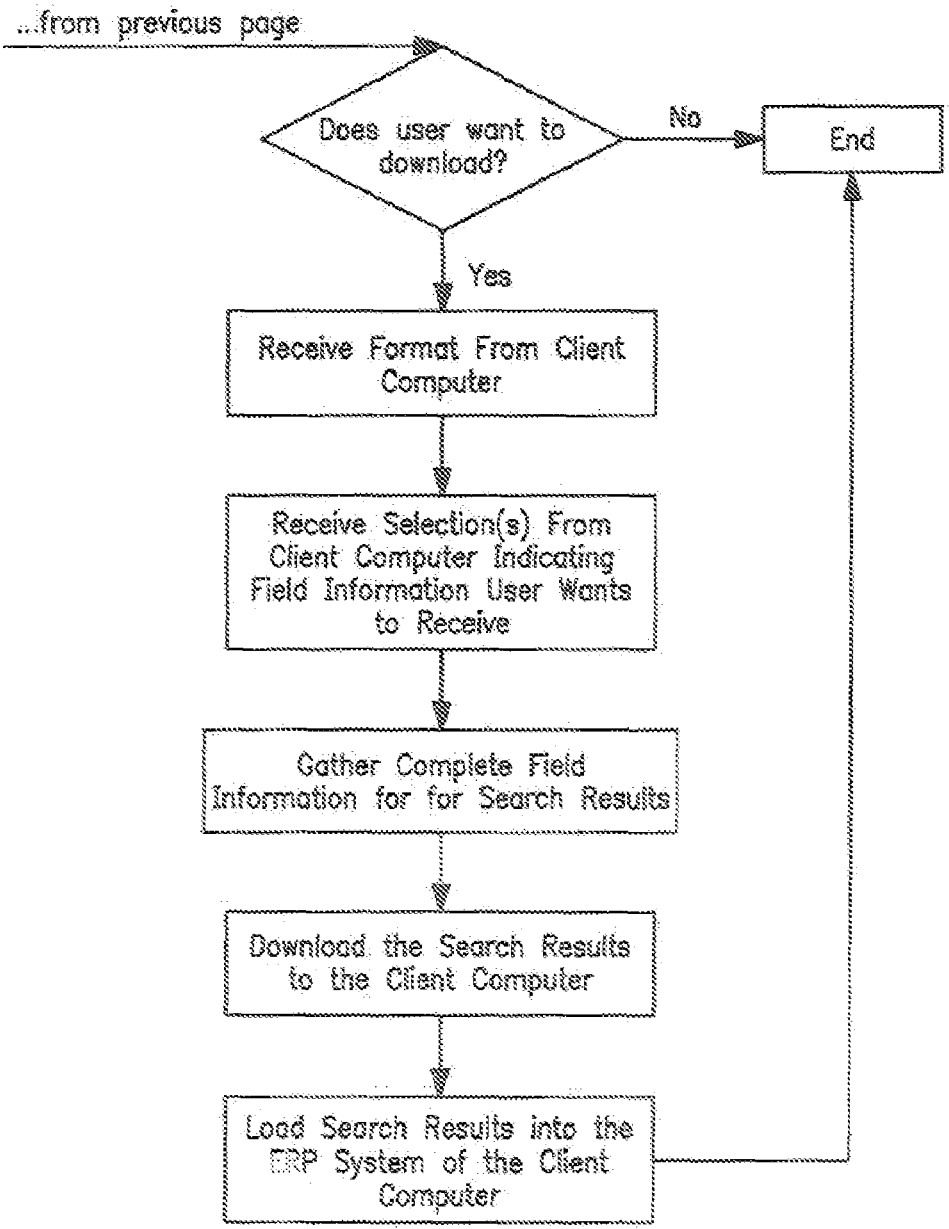
Figure 13:
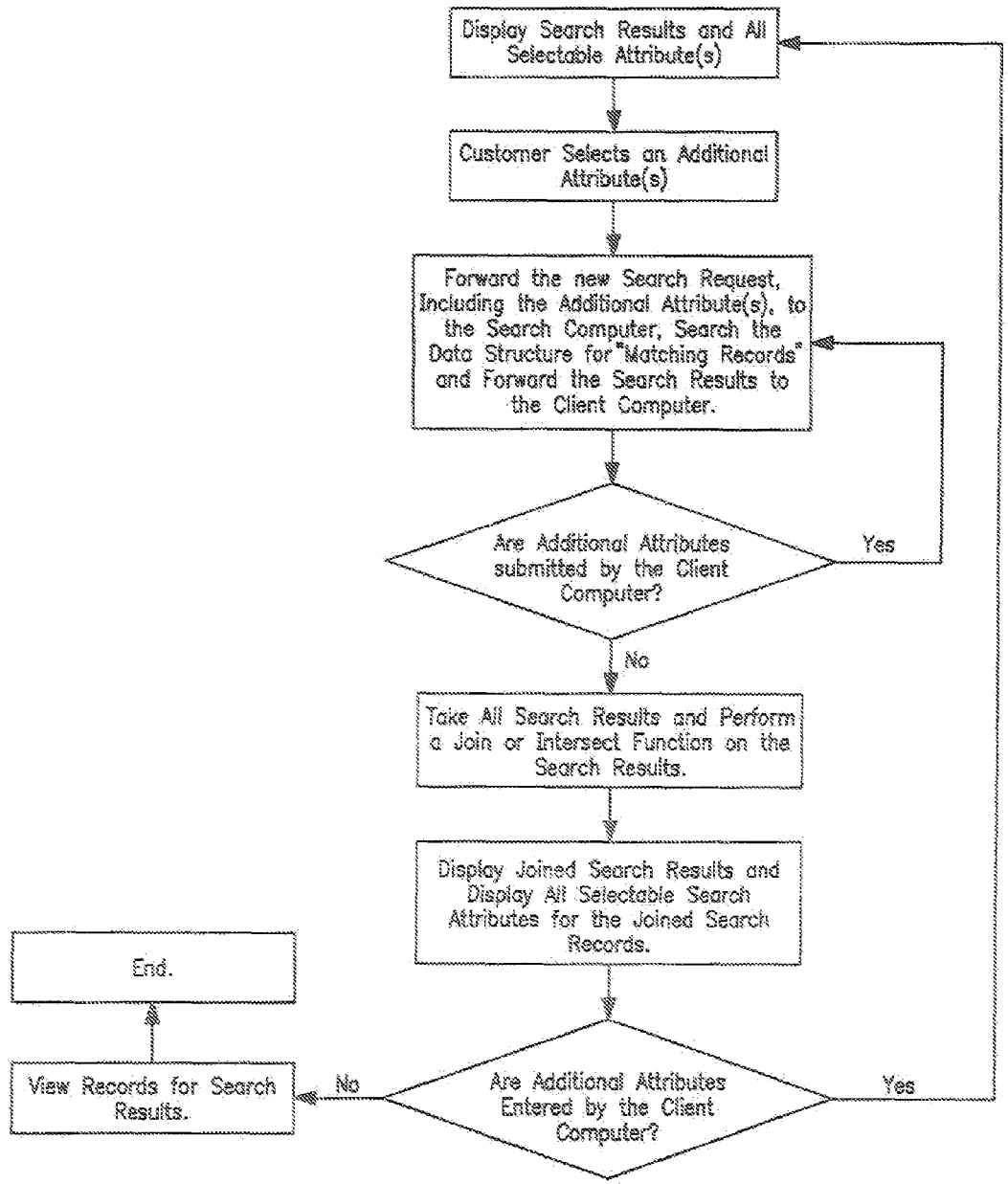
FIG. 13 is a diagram illustrating an exemplary method for processing a search request including additional attributes that are submitted by the client computer, after search results have already been provided, the process including steps for executing a join/intersection function to merge the search results from the search requests and displaying selectable search attributes that exist for the joined search results.

As exemplified in FIG. 12, the search results 38 may be provided to the user computer 24c in a variety of formats. For example, after the search results 38 have been displayed, the user may chose to download the search results 38. If the user selects the download option, a group of format options and field information options will be displayed on the user computer 24c. Then, the server computer 24A will format the search results 38 according to the format options and the field information options that are selected by the user. It should also be understood by those with skill in the art that the search computer 22b could also format the search results 38 in accordance with the format options and the field information options that are selected by the user. After the search results 38 are properly formatted, the server computer may download the search results 38 into the user computer 24c and possibly into the ERP system of the user computer 24c, thereby providing the user computer 22b with a customized product catalog. The user computers 22b may receive the customized product catalog or search results 38 in a variety of formats, such as XML, fixed length records, or string delimited. The search results can also be place into a PDF file, spreadsheet, or the like.

While specific embodiments of the present invention have been described in detail, it will be appreciated by those skilled in the art that various modifications and alternatives to those details could be developed in light of the overall teachings of the disclosure. For example, the processes described with respect to computer executable instructions can be performed in hardware or software without departing from the spirit of the invention. Furthermore, the order of all steps disclosed in the figures and discussed above has been provided for exemplary purposes only. Therefore, it should be understood by those skilled in the art that these steps may be rearranged and altered without departing from the spirit of the present invention. In addition, it is to be understood that all patents discussed in this document are to be incorporated herein by reference in their entirety. Moreover, while the present invention is described in terms of JAVA code, it should also be understood that the present invention may be programmed in various other software languages. Accordingly, the particular arrangement disclosed is meant to be illustrative only and not limiting as to the scope of the invention which is to be given the full breadth of the appended claims and any equivalents thereof.

What is claimed is:

1. A method for allowing a customer to create a customized product catalog from a supplier maintained electronic catalog, comprising:

receiving at a supplier server computer from a customer client computer in communication with the supplier server computer via the Internet a request, entered by the customer at the customer client computer, to search the supplier maintained electronic catalog, wherein the supplier maintained electronic catalog is stored within a database associated with the supplier server computer, the supplier maintained electronic catalog is comprised of data representative of a plurality of products each having one or more attributes, and the request includes at least one customer-specified attribute of interest;

causing the supplier server computer to examine the data to identify the products in the supplier maintained electronic catalog that have an attribute corresponding to the customer-specified attribute of interest;

causing the supplier server computer to aggregate the identified products into a sub-catalog whereby the sub-catalog is comprises of data representative of the identified products;

causing the supplier server computer to format the sub-catalog, comprised of data representative of the aggregated, identified products, to create a single machine readable electronic file version of the sub-catalog having a customer-specified electronic file format; and causing the supplier server computer to download, via the Internet, the single electronic file version of the sub-catalog to the customer client computer whereby the data representative of the aggregated, identified products within the sub-catalog comprises the customized product catalog and is accessible to the customer without requiring further access to the supplier maintained electronic catalog.

2. The method as recited in claim 1, wherein the electronic file format is selected from a group consisting of XML records, fixed length records, and string delimited records.

3. A method for allowing a customer to create a customized product catalog from a supplier maintained electronic catalog, comprising:

receiving at a supplier server computer from a customer client computer in communication with the supplier server computer via the Internet a request, entered by the customer at the customer client computer, to search the supplier maintained electronic catalog, wherein the supplier maintained electronic catalog is stored within a database associated with the supplier server computer, the supplier maintained electronic catalog is comprised of data representative of a plurality of products each having one or more attributes, and the request includes at least one customer-specified attribute of interest;

causing the supplier server computer to examine the data to identify the products in the supplier maintained electronic catalog that have an attribute corresponding to the customer-specified attribute of interest;

causing the supplier server computer to aggregate the identified products into a sub-catalog whereby the sub-catalog is comprised of data representative of the identified products;

causing the supplier server computer to format the sub-catalog, comprised of data representative of the aggregated, identified products, to create a single machine readable electronic file version of the sub-catalog having an electronic file format that is compatible with a customer-specified computer type; and causing the supplier server computer to download, via the Internet, the single electronic file version of the sub-catalog to the customer computer whereby the data representative of the aggregated, identified products within the sub-catalog comprises the customized product catalog and is accessible to the customer without requiring further access to the supplier maintained electronic catalog.

4. The method as recited in claim 3, wherein the electronic file format is selected from a group consisting of XML records, fixed length records, and string delimited records.

5. The method as recited in claim 3, wherein the supplier server computer formats the sub-catalog to match the electronic file format utilized by a customer computer in conducting electronic, commercial transactions.

6. A system for allowing a customer to create a customized product catalog from a supplier maintained electronic catalog, comprising:

a supplier server computer in communication via the Internet with a customer client computer which receives from the customer client computer a request, entered by the customer at the customer client computer, to search the supplier maintained electronic catalog wherein the request includes at least one customer-specified attribute of interest;

a database associated with the supplier server computer in which is stored the supplier maintained electronic catalog, wherein the supplier maintained electronic catalog is comprised of data representative of a plurality of products each having one or more attributes;

a search engine associated with the supplier server computer which, in response to the receipt of the request by the supplier server computer, examines the data to identify the products in the supplier maintained electronic catalog that have an attribute corresponding to the customer-specified attribute and which aggregates the identified products into a sub-catalog whereby the sub-catalog is comprised of data representative of the identified products; and a formatter associated with the supplier server computer that formats the sub-catalog, comprised of data representative of the aggregated, identified products, to create a single machine readable electronic file version of the sub-catalog having a customer-specified electronic file format;

wherein the supplier server computer further provides for downloading, via the Internet, the single electronic file version of the sub-catalog to the customer client computer such that the data representative of the aggregated, identified products within the sub-catalog comprises the customized product catalog and is accessible to the customer without requiring further access to the supplier maintained electronic catalog.

7. The system as recited in claim 6, wherein the electronic file comprises a spreadsheet.

8. The system as recited in claim 6, wherein the client computer has an associated enterprise resource planning system into which the electronic file is downloaded.

9. The system as recited in claim 6, wherein the formatter formats the electronic file using a format selected from the group consisting of XML records, fixed length records, and string delimited records.

10. For use with a supplier server computer, a computer-readable media carrying computer-readable instructions for allowing a customer to create a customized product catalog from a supplier maintained electronic catalog, the instructions performing steps comprising:

receiving at a supplier server computer from a customer client computer in communication with the supplier server computer via the Internet a request, entered by the customer at the customer client computer, to search the supplier maintained electronic catalog, wherein the supplier maintained electronic catalog is stored within a database associated with the supplier server computer, the supplier maintained electronic catalog is comprised of data representative of a plurality of products each having one or more attributes, and the request includes at least one customer-specified attribute of interest;

causing the supplier server computer to examine the data to identify the products in the supplier maintained electronic catalog that have an attribute corresponding to the customer-specified attribute of interest;

causing the supplier server computer to aggregate the identified products into a sub-catalog whereby the sub-catalog is comprises of data representative of the identified products;

causing the supplier server computer to format the sub-catalog, comprised of data representative of the aggregated, identified products, to create a single machine readable electronic file version of the sub-catalog having a customer-specified electronic file format; and causing the supplier server computer to download, via the Internet, the single electronic file version of the sub-catalog to the customer client computer whereby the data representative of the aggregated, identified products within the sub-catalog comprises the customized product catalog and is accessible to the customer without requiring further access to the supplier maintained electronic catalog.

11. The computer-readable media as recited in claim 10, wherein the instructions perform the step of placing the sub-catalog into an electronic file having a pdf electronic file format.

12. The computer-readable media as recited in claim 10, wherein the electronic file format is selected from a group consisting of XML records, fixed length records, and string delimited records.

* * * * *